US008750533B2

(12) United States Patent
Oddoart et al.

(10) Patent No.: US 8,750,533 B2
(45) Date of Patent: Jun. 10, 2014

(54) VOLTAGE SUPPLY CIRCUITRY AND INTEGRATED CIRCUIT THEREFOR

(75) Inventors: Ludovic Oddoart, Frouzins (FR); Dennis Cashen, Lake Zurich, IL (US); Cor Voorwinden, Toulouse (FR)

(73) Assignee: Freescale Semiconductor, Inc., Austin, TX (US)

( * ) Notice: Subject to any disclaimer, the term of this patent is extended or adjusted under 35 U.S.C. 154(b) by 1121 days.

(21) Appl. No.: 12/672,319

(22) PCT Filed: Aug. 13, 2007

(86) PCT No.: PCT/IB2007/004449
§ 371 (c)(1), (2), (4) Date: Feb. 5, 2010

(87) PCT Pub. No.: WO2009/022196
PCT Pub. Date: Feb. 19, 2009

(65) Prior Publication Data
US 2011/0051949 A1 Mar. 3, 2011

(51) Int. Cl.
*H04R 1/10* (2006.01)
*H02B 1/00* (2006.01)
*H04R 5/02* (2006.01)

(52) U.S. Cl.
USPC .......... 381/74

(58) Field of Classification Search
USPC .......... 381/74, 311, 309, 123, 124
See application file for complete search history.

(56) References Cited

U.S. PATENT DOCUMENTS

2003/0202341 A1 10/2003 McClanahan
2004/0252487 A1 12/2004 McCullough et al.
2005/0184807 A1 * 8/2005 Doy et al. .......... 330/297

FOREIGN PATENT DOCUMENTS

EP 1499017 A 1/2005
EP 1536663 A 6/2005
JP 02248195 A 10/1990
JP 09191571 A 7/1997
JP 2000224327 A 8/2000
JP 2005072867 A 3/2005
WO 2006/031304 A2 3/2006

OTHER PUBLICATIONS

Texas Instruments Incorporated: "Single-Cell Li-ION Battery—And Power-Management IC" TPS65820, pp. 1-98, www.ti.com, SLVS663B—May 2008—Revised Apr. 2008.
Qualcomm Cdma Technologies: "Power Management ICs Optimized System Solutions" PM7500, pp. 1-2, USA, PM7500_Nov. 2005.
Qualcomm CDMA Technologies: "Power Management ICs Optimized System Solutions" PM6640, pp. 1-2, USA, FM6640_Nov. 2005.
International Search Report and Written Opinion correlating to PCT/IB2007/004449 dated Sep. 2, 2008.

* cited by examiner

*Primary Examiner* — Vivian Chin
*Assistant Examiner* — Douglas Suthers

(57) ABSTRACT

A voltage supply circuitry is capable of coupling to wired audio headset circuitry and configurable to operate in a first mode, wherein the voltage supply circuitry provides a voltage supply to the wired audio headset functionality circuitry. The voltage supply circuitry is further capable of coupling to visual indication circuitry and further configurable to operate in a second mode, wherein the voltage supply circuitry provides a voltage supply to the visual indication circuitry.

20 Claims, 6 Drawing Sheets

VOLTAGE SUPPLY CIRCUITRY AND INTEGRATED CIRCUIT THEREFOR

FIELD OF THE INVENTION

The field of the invention relates to voltage supply circuitry, and more particularly to provision of a voltage supply for a wired audio headset and a visual indication of wireless headset functionality.

BACKGROUND OF THE INVENTION

In the field of mobile telecommunications, it is known for mobile communication units, such as mobile telephone handsets, to provide personal hands-free functionality in, say, a form of an audio headset. Traditionally, an accessory such as an audio headset may be connected to the mobile telephone handset via a wire, one end of which comprises, for example, a jack that plugs into a socket provided by the mobile telephone handset. More recently, wireless audio headset accessories have become popular, in particular in a form of Bluetooth™ headsets. Consequently, current mobile telephone handsets are required to provide wired and wireless audio headset capabilities. Furthermore, such handsets are required to provide wired and wireless audio attach signalling capabilities.

It has also become a commercial requisite for wireless (audio) attach functionality to comprise a visual indication of a status of wireless functionality, typically in a form of a blue light emitting diode (LED), which requires a boosted positive voltage (namely a voltage greater than a voltage available from the handset battery source).

FIG. 1 illustrates an example of voltage supply circuitry for wired audio headset functionality 110 and for a visual indication 120 of a status of wireless functionality, for example within a mobile communication unit, as is known in the art. Due to their respective voltage requirements, the wired audio headset functionality 110 and the visual indication element 120 are each provided with a dedicated voltage supply.

For the illustrated example, the voltage supply for the wired audio headset functionality 110 comprises a voltage regulator 115, operatively coupled to a 3.6 v voltage supply ($V_{bat}$) supplied from a battery source (not shown). The voltage regulator 115 provides the wired audio headset functionality 110 with a supply voltage ($V_{audio}$) of 2.8 v. The wired audio headset functionality 110 provides two audio outputs for a headset coupled thereto. Each output is coupled to a headset via a coupling capacitor 117 to remove a DC (direct current) offset. Typically, wired audio headset functionality requires a positive voltage supply and a negative voltage supply for a capacitor-less coupled audio amplifier implementation.

The voltage supply for the visual indication element 120 of a wireless operation comprises Boost or Charge Pump circuitry 125, which is also coupled to the voltage supply ($V_{bat}$) from the battery. The Boost/Charge Pump circuitry 125 provides the visual indication element 120 with a boost voltage ($V_{boost}$) of, say, 5.5 v. The boost voltage ($V_{boost}$) is provided to the visual indication element 120, which is also coupled to a driver circuit 127.

The voltage supply circuitry for wired audio headset functionality 110 and for visual indication element 120 of a wireless operation may be provided on a semiconductor device 130, such as an integrated circuit. Also illustrated is DC/DC converter circuitry 140, arranged to provide a 1.8 v voltage supply ($V_{mem}$) to, for example, memory components, or other components of the mobile communication unit. As will be appreciated, the provision of a dedicated voltage supply for each of the wired audio headset functionality 110 and for the visual indication element 120 of the status of wireless functionality is consuming in terms of silicon area, and is also expensive in terms of component count.

As more sophisticated functionality permeates its way down to lower tier mobile telephone handsets, the need to provide such functionality, whilst keeping the size and cost of the handset as low as possible, increases. Thus, a need exists for an improved voltage supply circuitry for wired audio headset functionality circuitry that is also able to support visual indication circuitry for wireless (headset) attach signalling functionality, for example within a mobile communication unit.

SUMMARY OF THE INVENTION

In accordance with aspects of the invention, there is provided a voltage supply circuitry and a semiconductor device comprising at least part of a voltage supply circuitry as defined in the appended Claims.

Specific embodiments of the invention as set forth in the dependent claims. Further details and aspects will be described, by way of example only, with reference to the drawings.

DESCRIPTION OF EMBODIMENTS

Embodiments of the invention will now be described in terms of a mobile communication unit arranged to provide wired and wireless (audio headset) attach signalling capabilities. Although embodiments of the invention will be described in terms of a mobile communication unit, it will be appreciated that the inventive concept herein described may be embodied in any apparatus that incorporates wired and wireless audio headset capabilities.

A voltage supply circuitry may be arranged to be coupled to wired audio headset circuitry and configurable to operate in a first mode, wherein the voltage supply circuitry provides a voltage supply to the wired audio headset circuitry. The voltage supply circuitry may be further arranged to be coupled to visual indication circuitry and further configurable to operate in a second mode, wherein the same voltage supply circuitry provides a voltage supply to the visual indication circuitry.

Figure 1:
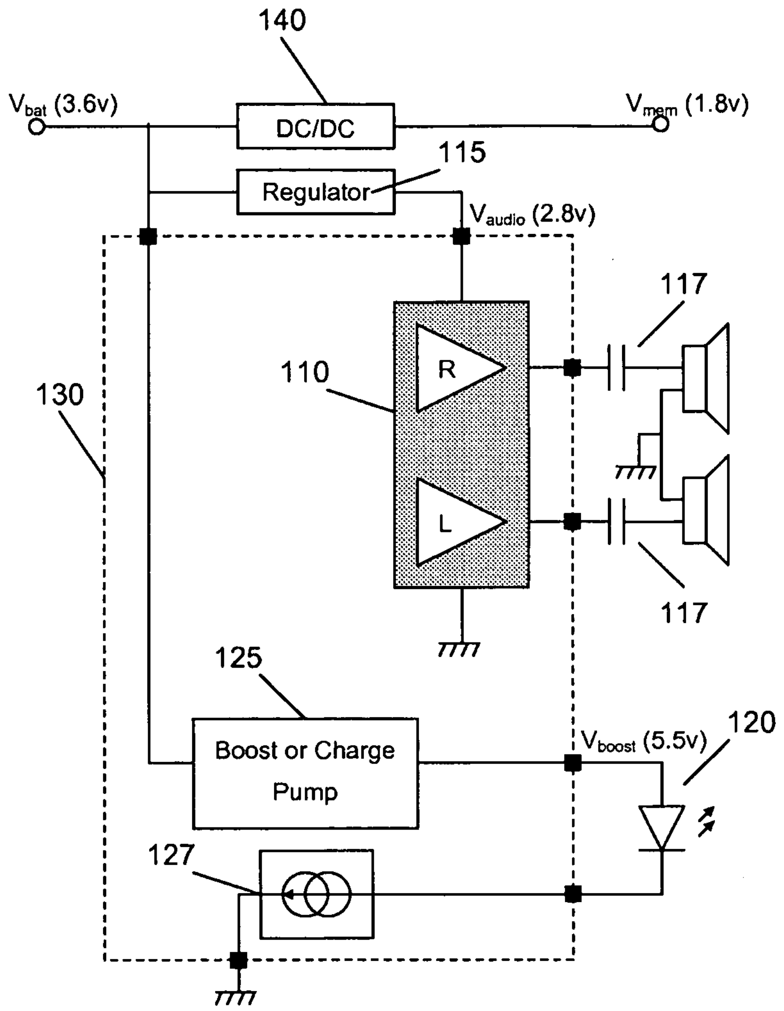
FIG. 1 (Prior Art)
FIG. 1 illustrates an example of known voltage supply circuitry.
Figure 2:
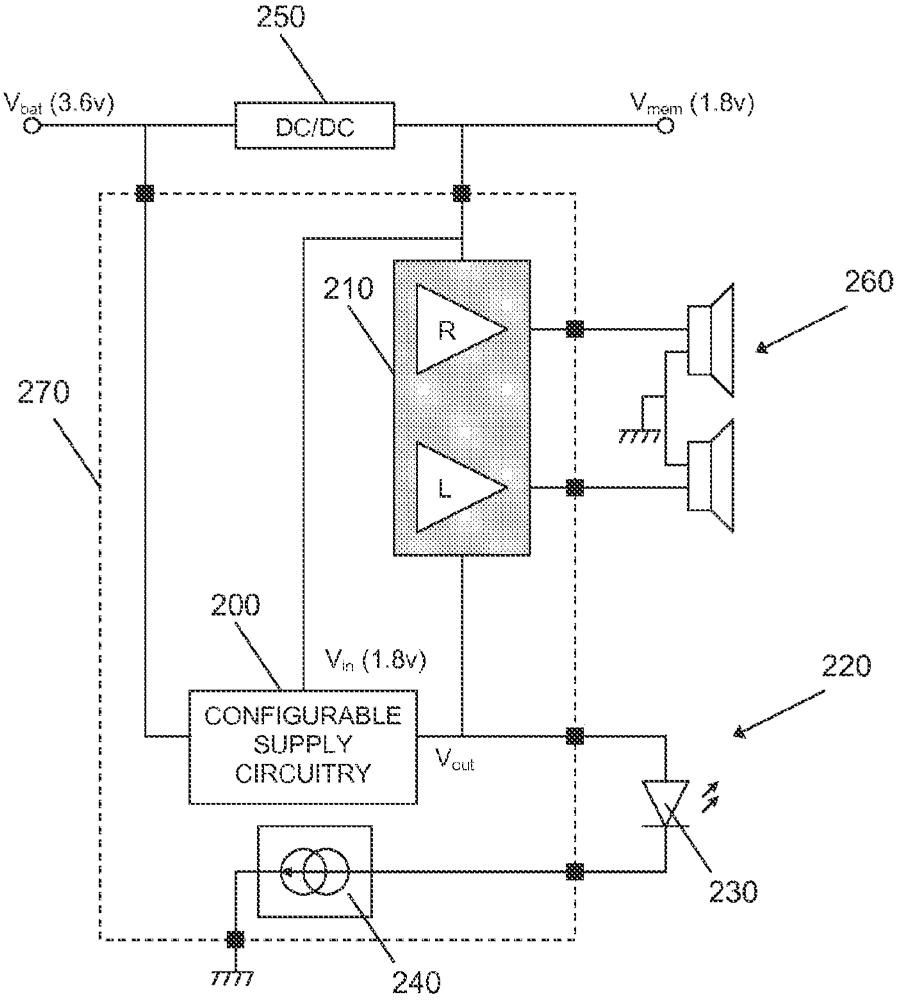
FIG. 2 illustrates voltage supply circuitry in accordance with an embodiment of the invention.

Referring now to FIG. 2, there is illustrated a configurable voltage supply circuitry 200 in accordance with an embodiment of the invention. The configurable voltage supply circuitry 200 is coupled to a voltage source, which for the illustrated embodiment takes the form of $V_{bat}$, provided by a battery source (not shown) of, for example, a mobile communication unit of which the configurable voltage supply circuitry 200 forms a part. The configurable voltage supply circuitry 200 is coupled to wired audio headset circuitry 210 and visual indication circuitry 220. The visual indication circuitry 220 comprises a visual indication element 230 operably coupled to driver circuitry 240, and provides an indication of a status of wireless (headset) attach functionality (not shown) of the mobile communication unit.

Also illustrated in FIG. 2 is a DC/DC converter 250, which converts $V_{bat}$ to a voltage supply ($V_{mem}$) for other components (not shown) such as memory elements and the like. For the illustrated embodiment, for the purpose of power efficiency of the system, wired audio headset circuitry 210 is further coupled to, and receives as a positive voltage supply, $V_{mem}$. Configurable voltage supply circuitry 200 is also coupled to $V_{mem}$.

The configurable voltage supply circuitry 200 may be configurable to operate in a first mode, wherein the voltage supply circuitry provides a voltage supply to the wired audio headset circuitry 210. For the illustrated embodiment, the configurable voltage supply circuitry 200, when operating in the first mode, provides the wired audio headset circuitry 210 with a negative voltage supply, substantially equal and opposite to the positive voltage supply $V_{mem}$. Thus, for the illustrated embodiment, the wired audio headset circuitry 210 receives a positive voltage supply, e.g. of 1.8V, from the DC/DC converter 250, and a negative voltage supply, e.g. of −1.8V, from the configurable voltage supply circuitry 200, when the configurable voltage supply circuitry 200 is configured to operate in the first mode.

The configurable voltage supply circuitry 200 is further configurable to operate in a second mode, wherein the configurable voltage supply circuitry 200 provides a voltage supply to the visual indication circuitry 220. Thus, the first mode and second mode are mutually exclusive modes of operation, in that only one of the first mode or second mode may be operational at any point in time.

For the illustrated embodiment, the visual indication element 230 is in a form of a light emitting diode (LED). As will be appreciated by a skilled artisan, visual indications of a status of wireless (headset) attach functionality for mobile communication units, for example mobile telephone handsets, typically comprise blue light emitting elements. Consequently, the visual indication circuitry 200 may comprise a blue LED. As will also be appreciated by a skilled artisan, typically blue LEDs require a voltage greater than that provided by a battery source from within a mobile communication unit. For example, to operate, a blue LED may require a voltage greater than approximately 4.2V, whilst a battery source within a mobile communication unit may provide a voltage of approximately only 3.6V. Accordingly, for the illustrated embodiment, the voltage supply circuitry 200, when operating in the second mode, is configured to provide a boosted voltage supply to the visual indication circuitry 220.

The ability of the configurable voltage supply circuitry 200 to be configured to operate in either of two modes, a first mode in which the configurable voltage supply circuitry 200 provides a voltage supply to the wired audio headset circuitry 210 and a second mode in which the configurable voltage supply circuitry 200 provides a voltage supply to the visual indication circuitry 220, substantially alleviates the problem of having to provide a dedicated voltage supply for each of the wired audio headset circuitry 210 and the visual indication circuitry 220. In this manner, a cost of providing a voltage supply to the wired audio headset circuitry and the visual indication circuitry, in terms of component count and silicon area, may be significantly reduced.

As will be appreciated by a skilled artisan, since the use of wired audio headset circuitry and wireless (headset) attach functionality tend to be mutually exclusive, the provision of common voltage supply circuitry for both the wired audio headset circuitry and the visual indication circuitry for the wireless (headset) attach functionality is unlikely to result in a conflict between the voltage supply demands of the two functionalities.

As previously mentioned, for the embodiment illustrated in FIG. 2, the configurable voltage supply circuitry 200, when configured to operate in the first mode, provides the wired audio headset circuitry 210 with a negative voltage supply, substantially equal and opposite to the positive voltage supply $V_{mem}$, that is also provided to the wired audio headset circuitry 210 by the DC/DC converter 250. As will be appreciated by a skilled artisan, by using these two opposing voltage supplies for amplifying audio signals provided to an audio headset 260 connected thereto, the resulting audio signals would comprise substantially no DC (offset) component, making these resulting audio signals ground referred. Accordingly, and as illustrated in FIG. 2, the audio headset 260 may be coupled to the audio headset circuitry 210 without a need for coupling capacitors, further enabling a reduction in the cost of the wired audio headset circuitry, in terms of component count and silicon area.

Furthermore, it is envisaged that the configurable voltage supply circuitry 200 may form part of a semiconductor device, such as integrated circuitry (IC) 270. It is further envisaged that the configurable voltage supply circuitry 200 may form a part of a semiconductor device comprising the wired audio headset functionality and the visual indication circuitry.

Figure 3:
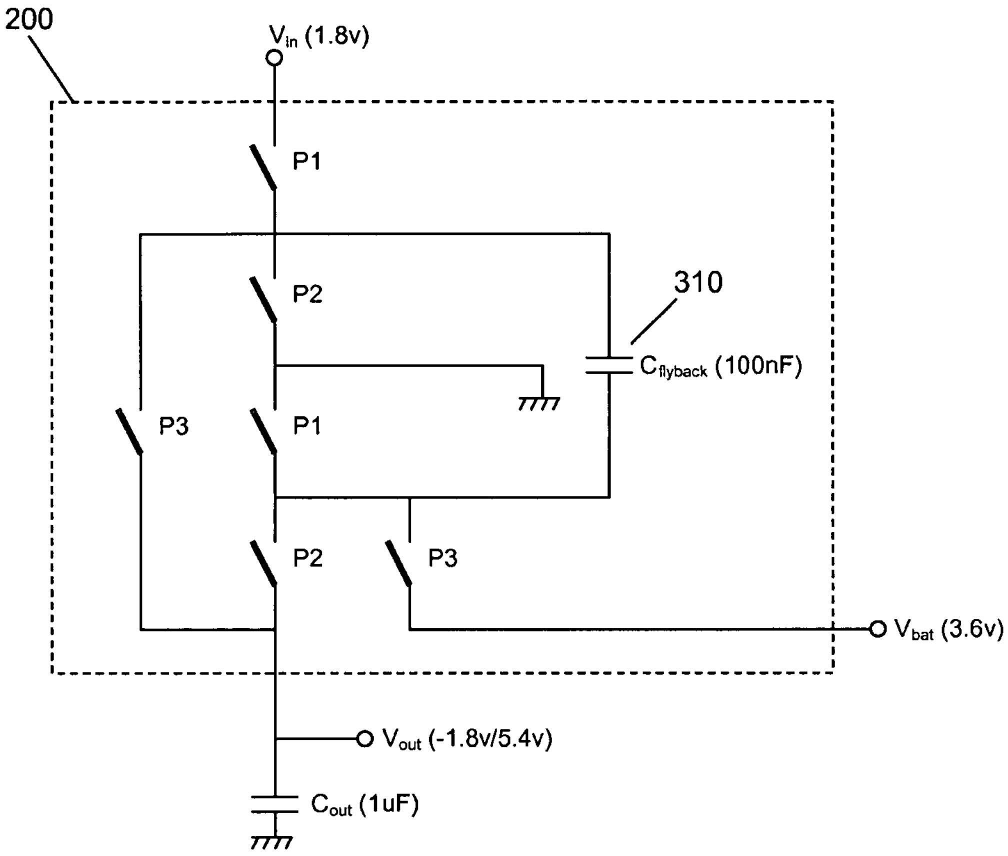
FIG. 3 illustrates an example of voltage supply circuitry according to an embodiment of the invention.

Referring now to FIG. 3, there is illustrated an example of a configurable voltage supply circuitry 200 according to an embodiment of the invention. For the illustrated embodiment, the configurable voltage supply circuitry 200 comprises a charge storage device, in a form of a capacitor 310, and a plurality of switching elements, referenced P1, P2 and P3.

Figure 4:
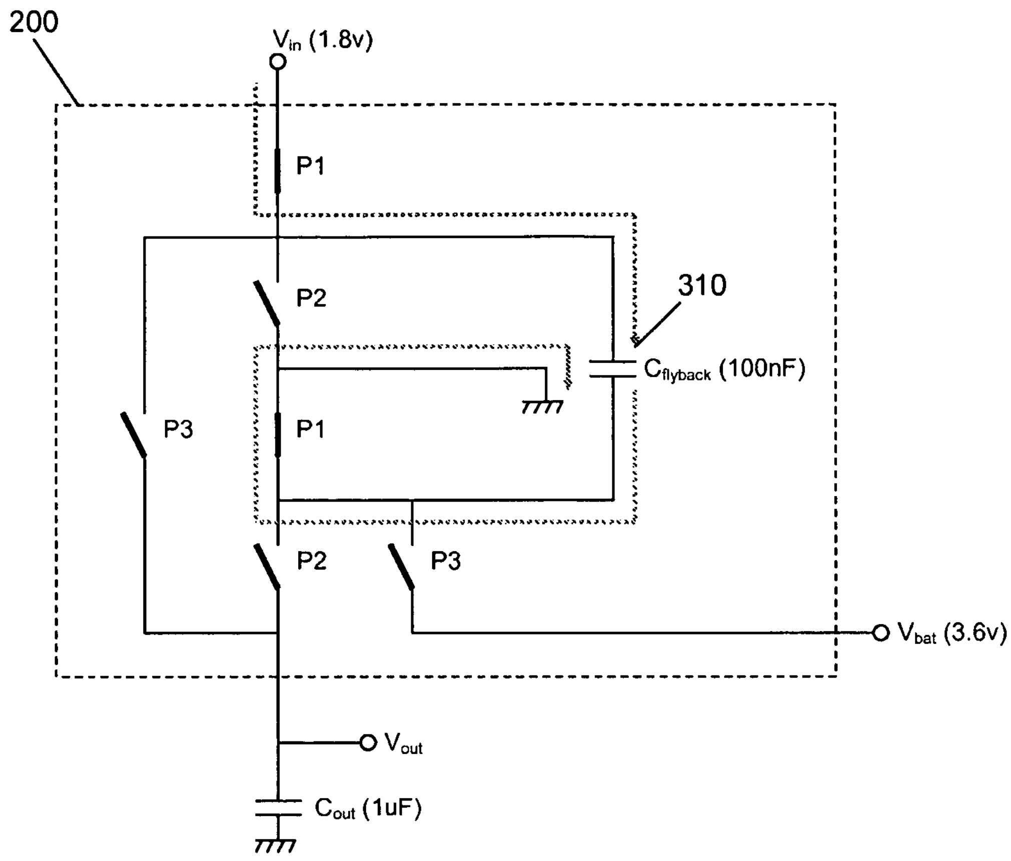
FIG. 4 illustrates the voltage supply circuitry of FIG. 3 in a first state.

Referring now to FIG. 4, there is illustrated the configurable voltage supply circuitry 200 of FIG. 3 in a first state. In this first state, two of the switching elements, referenced P1, are configured in a closed condition, whilst switching elements P2 and P3 are configured in an open condition. In this manner, a first connection of the capacitor 310 is coupled to $V_{in}$, which as illustrated in FIG. 2 is, in turn, coupled to the output of the DC/DC converter, and as such provides 1.8 volts to a first connection of the capacitor 310. A second connection of the capacitor 310 is coupled to ground. Accordingly, the capacitor is charged to a potential difference of 1.8V.

Figure 5:
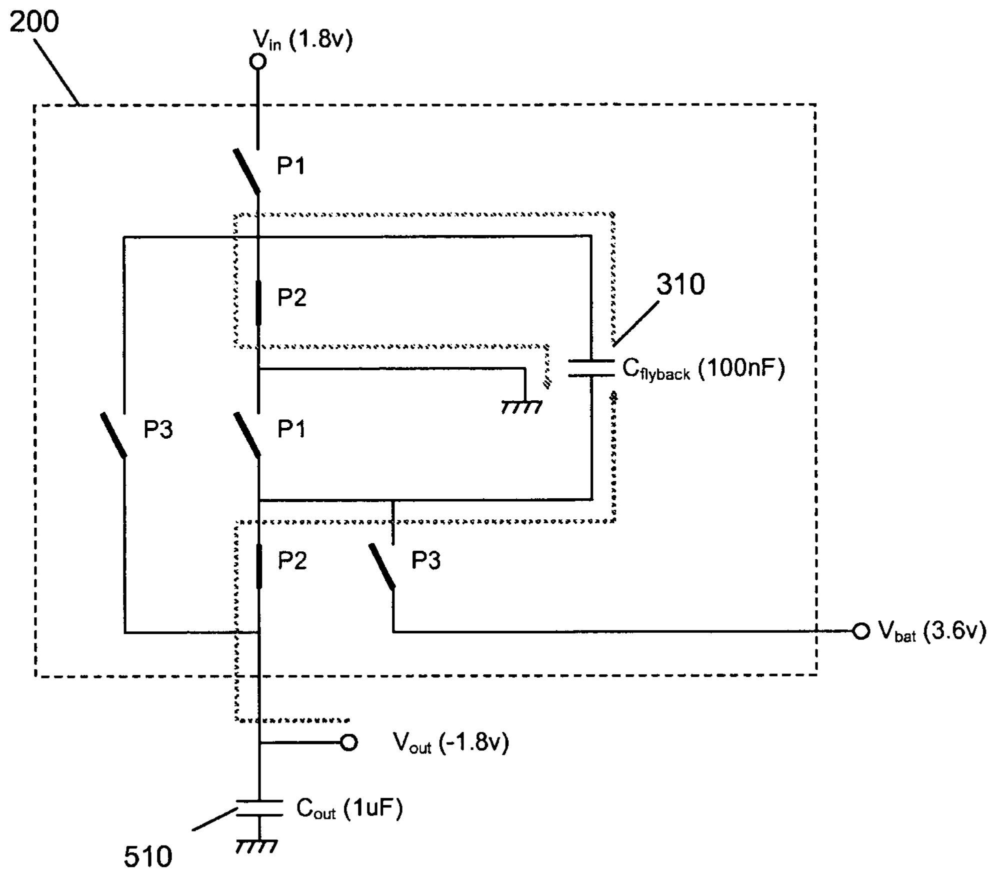
FIG. 5 illustrates the voltage supply circuitry of FIG. 3 in a second state.

Referring now to FIG. 5, there is illustrated the voltage supply circuitry 200 of FIG. 3 in a second state. In this second state, switching elements P1 are opened, following the first state illustrated in FIG. 4, whilst switching elements P2 are closed. Switching elements P3 remain open. In this manner, the first connection of the capacitor 310 is decoupled from $V_{in}$, and coupled to ground. Conversely, the second connection of the capacitor 310 is decoupled from ground, and coupled to $V_{out}$. In this manner, due to a potential difference of 1.8 v across the capacitor 310, this reversal of polarity of the capacitor results in a negative voltage of −1.8V at $V_{out}$.

Thus, by initially placing the configurable voltage supply circuitry 200 into the first state, illustrated in FIG. 4, whereby the capacitor is charged to a positive voltage of 1.8V, and subsequently placing the configurable voltage supply circuitry 200 into the second state, illustrated in FIG. 5, whereby the polarity of the capacitor is reversed to create a negative voltage, the configurable voltage supply circuitry 200 may be configured to provide a negative voltage supply of −1.8V to the wired audio headset circuitry 210.

In order to maintain the −1.8 v at $V_{out}$, the voltage supply circuitry 200 is alternated between the first and second states, enabling the capacitor 310 to be re-charged. A second, output capacitor ($C_{out}$) 510 is operably coupled to $V_{out}$, such that when the voltage supply circuitry 200 is in the second state, the output capacitor 510 is substantially charged to −1.8 v, and which substantially maintains the −1.8 v at $V_{out}$ whilst the supply circuitry alternates to the first state.

Figure 6:
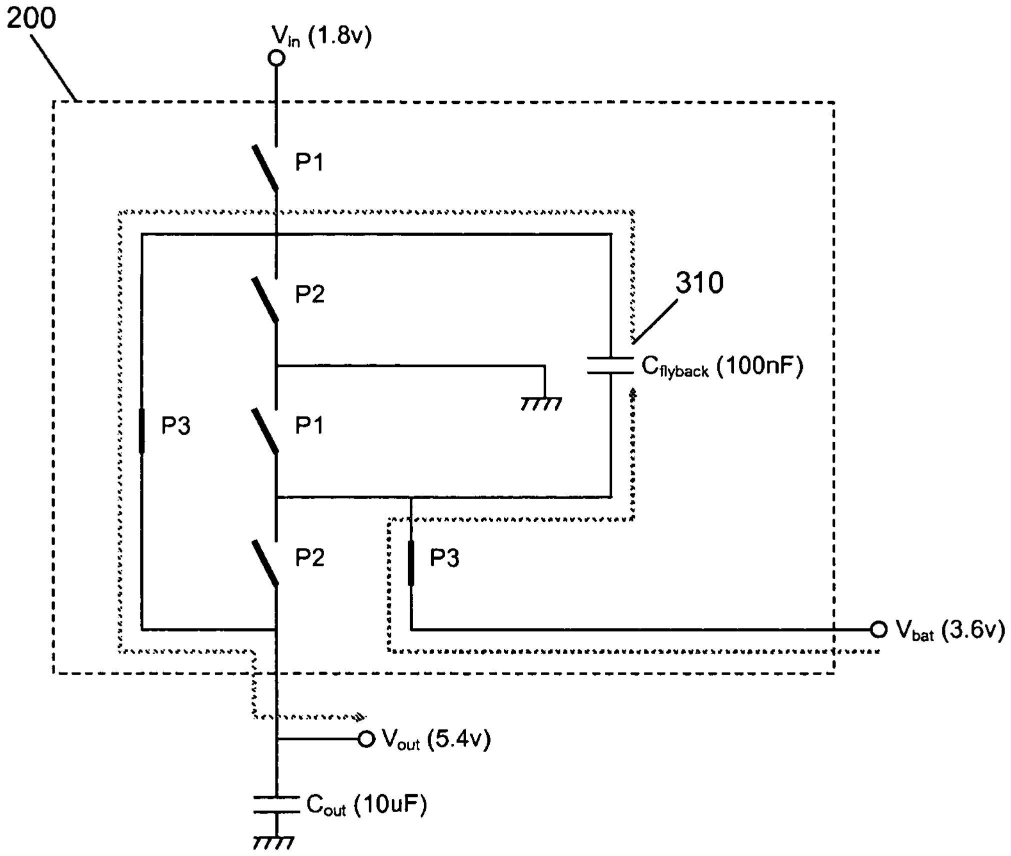
FIG. 6 illustrates the voltage supply circuitry of FIG. 3 in a third state.

Referring now to FIG. 6, there is illustrated the configurable voltage supply circuitry 200 of FIG. 3 in a third state. In this third state, switching elements P1 are opened, following the first state illustrated in FIG. 4, whilst switching elements P3 are closed. Switching elements P2 remain open. In this manner, the first connection of the capacitor 310 is decoupled from $V_{in}$, and coupled to $V_{out}$. Conversely, the second connection of the capacitor 310 is decoupled from ground, and coupled to $V_{bat}$. In this manner, due to the potential difference of 1.8V across the capacitor 310, the voltage provided by Vbat is boosted from 3.6V (for the illustrated embodiment) to 5.4V.

Thus, by initially putting the voltage supply circuit 200 into the first state, illustrated in FIG. 4, whereby the capacitor is charged to 1.8 v, and subsequently putting the voltage supply circuit 200 into the third state, illustrated in FIG. 6, whereby the voltage provided by $V_{bat}$ is boosted to 5.4V by the voltage across the capacitor, the voltage supply circuitry 200 may be configured to provide a voltage supply of 5.4V to the visual indication circuitry 220.

In order to maintain the 5.4V at $V_{out}$, the voltage supply circuitry 200 is alternated between the first and third states, thereby enabling the capacitor 310 to be re-charged. When the voltage supply circuitry 200 is in the third state, the output capacitor 510 is substantially charged to 5.4V, and which substantially maintains the 5.4V at $V_{out}$ whilst the supply circuitry alternates to the first state.

It is envisaged that the switching elements P1, P2, P3 may comprise transistors or the like, and may be controlled by, and as such the configurable voltage supply circuitry may be configured by, a central processing unit (not shown) of the mobile communication unit. For example, the mobile communication unit may comprise logic or software arranged to control audio headset operation. In this manner, the central processing unit may be arranged to control wired audio headset circuitry and visual indicator circuitry for indicating a status of wireless (headset) attach functionality, and to configure the voltage supply circuitry in accordance with audio headset requirements.

It is within the contemplation of the invention that at least a part of the configurable voltage supply circuitry may be provided within a semiconductor device, such as an integrated circuit (IC) package, and in particular may be provided within a semiconductor device comprising a central processing unit. Alternatively, it is envisaged that a part of the configurable voltage supply circuitry, for example the switching elements P1, P2, P3 may be provided within a semiconductor device, whilst the charge storage device may be provided external to the semiconductor device, for example mounted on a printed circuit board on which the semiconductor device is also mounted. In this manner, the properties of the charge storage device, for example the capacitive value of the charge storage device, may be varied depending on the specific requirements of different applications.

It will be understood that the configurable voltage supply circuitry, as described above, aims to provide at least one or more of the following advantages:

(i) A provision of common voltage supply circuitry for wired audio headset circuitry and the visual indication circuitry for wireless (headset) attach functionality.

(ii) Reduced cost of providing a voltage supply to wired audio headset circuitry and visual indication circuitry, in terms of component count and silicon area.

(iii) Coupling of wired audio headset to audio headset circuitry without a need for coupling capacitors (iv) The inventive concept is backward compatible to legacy audio headset accessories, such as a stereo headset (using a jack) and a Bluetooth (ear-piece) accessory.

In particular, it is envisaged that the aforementioned inventive concept can be applied by a semiconductor manufacturer to any integrated circuit architecture supporting an improved voltage supply circuitry for wired audio headset circuitry and visual indication circuitry for a wireless (headset) attach functionality. It is further envisaged that, for example, a semiconductor manufacturer may employ the inventive concept in a design of a stand-alone device, or application-specific integrated circuit (ASIC) and/or any other sub-system element employing an integrated circuit to support an improved voltage supply circuitry for wired audio headset functionality circuitry and visual indication circuitry for the wireless (headset) attach functionality.

It will be appreciated that any suitable distribution of functionality between different functional units or logic or switching elements, may be used without detracting from the inventive concept herein described. Hence, references to specific functional devices or elements are only to be seen as references to suitable means for providing the described functionality, rather than indicative of a strict logical or physical structure or organization.

It is envisaged that aspects of the invention may be implemented in any suitable form including hardware, software, firmware or any combination of these. The elements and components of an embodiment of the invention may be physically, functionally and logically implemented in any suitable way. Indeed, the functionality may be implemented in a single unit or IC, in a plurality of units or ICs or as part of other functional units.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second' etc. do not preclude a plurality.

Thus, an improved voltage supply circuitry for wired audio headset circuitry and visual indication circuitry for wireless headset functionality has been described, where the aforementioned disadvantages with prior art arrangements have been substantially alleviated.

The invention claimed is:

1. A device comprising:

a voltage supply circuitry comprising an output coupled to a wired audio headset amplifier and coupled to visual indication circuitry:

in a first operational mode the voltage supply circuitry is to provide a negative voltage with respect to a reference voltage to the wired audio headset amplifier via the output; and in a second operational mode the voltage supply circuitry is to provide a positive voltage with respect to the reference voltage to the visual indication circuitry via the output.

2. The voltage supply circuitry of claim 1 wherein the negative voltage is equal to and opposite to a positive voltage supplied to the wired audio headset amplifier.

3. The voltage supply circuitry of claim 2 wherein the voltage supply circuitry provides a boosted voltage supply to the visual indication circuitry, when operating in the second mode.

4. The voltage supply circuitry of claim 1 wherein the voltage supply circuitry provides a boosted voltage supply to the visual indication circuitry when operating in the second mode.

5. The voltage supply circuitry of claim 1 further characterised in that the first operational mode and second mode are mutually exclusive modes of operation, wherein:

the first operational mode involves a first setting of switches of the voltage supply circuitry;

the second operational mode involves a second setting of the switches; and no setting of the switches enables the voltage supply circuitry to simultaneously provide negative voltage to the wired audio headset amplifier and provide positive voltage to the visual indication circuitry.

6. The voltage supply circuitry of claim 1 wherein the voltage supply circuitry provides a negative voltage to the wired audio headset amplifier by placing the voltage supply circuitry into a first state, whereby a charge storage device is charged to a positive voltage, and subsequently placing the voltage supply circuitry into a second state, whereby the polarity of the charge storage device is reversed to create a negative voltage.

7. The voltage supply circuitry of claim 6 wherein the voltage supply circuitry provides a boosted voltage supply to the visual indication circuitry by placing the voltage supply circuitry into the first state, and subsequently placing the voltage supply circuitry into a third state, whereby a voltage provided by a battery source is boosted by voltage of the charge storage device.

8. The voltage supply circuitry of claim 7 wherein the charge storage device comprises a capacitor.

9. The device of claim 1 wherein:

in the first operational mode the voltage supply circuitry does not provide the positive voltage with respect to the reference voltage to the visual indication circuitry; and in the second operational mode the voltage supply circuitry does not provide the negative voltage with respect to the reference voltage to the wired audio headset amplifier.

10. A semiconductor device comprising:

voltage supply circuitry capable of coupling to a wired audio headset amplifier and having a first operational mode in which a charge storage device of the voltage supply circuitry provides a negative voltage with respect to a reference voltage to the wired audio headset amplifier under a first configuration of switches of the voltage supply circuitry;

wherein the voltage supply circuit is further capable of coupling to visual indication circuitry and having a second operational mode in which the charge storage device provides a positive voltage with respect to the reference voltage to the visual indication circuitry under a second configuration of the switches; and wherein the charge storage device does not include a first component and a second component wherein:

the first component and the second component are charge storage devices;

the first component provides the negative voltage with respect to the reference voltage to the wired audio headset amplifier under the first configuration of switches of the voltage supply circuitry; and the second component provides the positive voltage with respect to the reference voltage to the visual indication circuitry under the second configuration of the switches.

11. The semiconductor device of claim 10 wherein the negative voltage is equal and opposite to a positive voltage supplied to the wired audio headset amplifier.

12. The semiconductor device of claim 10 wherein the voltage supply circuitry provides in the first operational mode a negative voltage to the wired audio headset circuitry by placing the voltage supply circuitry into a first state, whereby a charge storage device is charged to a positive voltage, and subsequently placing the voltage supply circuitry into a second state, whereby the polarity of the charge storage device is reversed to create a negative voltage.

13. The semiconductor device of claim 10 wherein the voltage supply circuitry is arranged to provide a boosted voltage supply to the visual indication circuitry by placing the voltage supply circuitry into a first state, whereby a charge storage device is charged to a positive voltage, and subsequently placing the voltage supply circuitry into a third state, whereby a voltage provided by a battery source is boosted by the voltage of the charge storage device.

14. The semiconductor device of claim 11 wherein the voltage supply circuitry provides in the first operational mode a negative voltage to the wired audio headset circuitry by placing the voltage supply circuitry into a first state, whereby a charge storage device is charged to a positive voltage, and subsequently placing the voltage supply circuitry into a second state, whereby the polarity of the charge storage device is reversed to create a negative voltage.

15. The semiconductor device of claim 14 wherein the voltage supply circuitry is arranged to provide a boosted voltage supply to the visual indication circuitry by placing the voltage supply circuitry into the first state and subsequently placing the voltage supply circuitry into a third state, whereby a voltage provided by a battery source is boosted by voltage of the charge storage device.

16. The semiconductor device of claim 12 wherein the voltage supply circuitry is arranged to provide a boosted voltage supply to the visual indication circuitry by placing the voltage supply circuitry into the first state and subsequently placing the voltage supply circuitry into a third state, whereby a voltage provided by a battery source is boosted by voltage of the charge storage device.

17. The semiconductor device of claim 10 wherein the voltage supply circuit is further capable of charging the charge storage device to a positive voltage under a third configuration of the switches.

18. The semiconductor device of claim 17 wherein the voltage supply circuit alternates between the first configuration of the switches and the third configuration of the switches to provide a negative voltage with respect to the reference voltage to the wired audio headset amplifier and to charge the storage device.

19. The semiconductor device of claim 17 wherein the voltage supply circuit alternates between the second configuration of the switches and the third configuration of the switches to provide a boosted voltage supply to the visual indication circuitry and to charge the storage device.

20. A method comprising:

providing by voltage supply circuitry during a first operational mode a negative voltage with respect to a reference voltage to a wired audio headset amplifier via an output; and providing by the voltage supply circuitry during a second operational mode a positive voltage with respect to the reference voltage to visual indication circuitry via the output, wherein:

the output is coupled to the wired audio headset amplifier and to the visual indication circuitry; and the first operational mode and the second operational mode do not coincide.

* * * * *